UNITED STATES PATENT OFFICE.

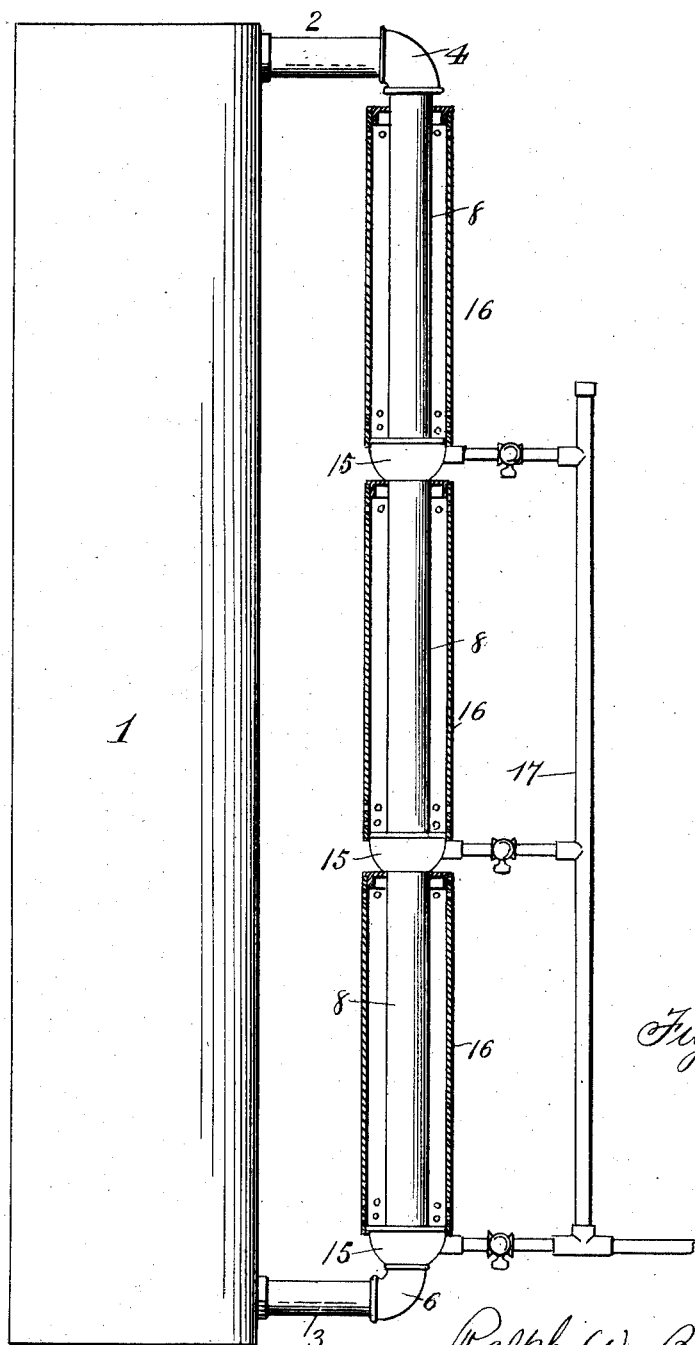

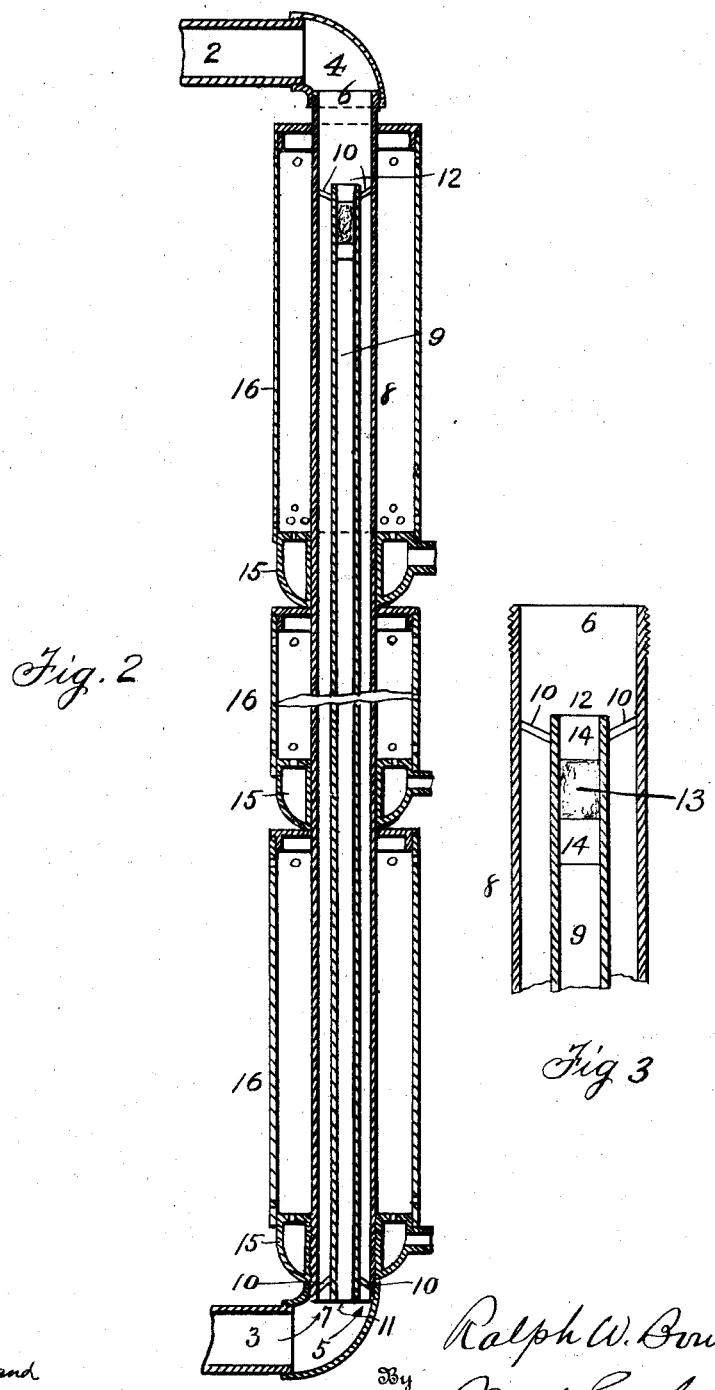

RALPH WALLACE BOWEN, OF WASHINGTON, DISTRICT OF COLUMBIA, ASSIGNOR TO FRANK H. WHEELOCK, OF THE DISTRICT OF COLUMBIA.

PORTABLE WATER-HEATER.

No. 864,760.　　　　Specification of Letters Patent.　　　　Patented Aug. 27, 1907.

Application filed May 22, 1907. Serial No. 375,166.

*To all whom it may concern:*

Be it known that I, RALPH WALLACE BOWEN, a citizen of the United States, residing at Washington, District of Columbia, have invented certain new and useful Improvements in Portable Water-Heaters, of which the following is a specification.

This invention relates to a new and useful improvement in heaters for heating water in water tanks or other receptacles for water, and it consists in the construction hereinafter pointed out.

In the annexed drawings: Figure 1 represents a water tank provided with the device, parts being in vertical section. Fig. 2, a vertical section of the device, and Fig. 3, an enlarged detailed vertical section of one part of the device.

In these drawings: the figure 1 represents a water tank or other water containing receptacle having the top and bottom connections or pipes 2 and 3 communicating with the interior of the tank. To these pipes 2 and 3 by elbows 4 and 5 are connected the upper and lower ends 6 and 7 of a vertical pipe 8, there being a clear passage from the tank 1 through the pipes 2 and 3, elbows 4 and 5 and vertical pipe 8. Within the pipe 8 there is centrally located another pipe 9 which is spaced from the pipe 8 by suitable spacers 10, the pipes 8 and 9 being approximately of the same length. The bottom 11 of the pipe 9 is open, but the top 12 is closed. This closure may be made by placing a water seal 13 therein with plugs 14, 14 of wood above and below the seal 13.

As indicated in the drawings, the pipe 8 may be provided with several burners or sources of heat 15, each having its own casing or jacket 16, and appropriate gas supply piping 17.

In use the water in the pipe 8 is heated from the burners 15 and passes into the tank 1. The central pipe 9 contains a body of air which speedily becomes heated and remains heated while the device is in use.

With this construction there is produced a thin body of water in the pipe 8 around the pipe 9. This water is heated by the heat applied to the outside of the pipe 8, and, being thin, is quickly and effectively heated as it rises. The body of hot air in the pipe 9 keeps the inner portions of the water hot and assists in heating the particles of water as they rise.

Having described the invention, what I claim is:

1. A water heater consisting of a vertical outer water pipe open at top and bottom, a vertical inner central pipe open at the bottom and closed at the top, and a burner or source of heat at the bottom of the outer pipe.

2. A water heater consisting of a vertical outer water pipe open at top and bottom, a vertical inner central pipe open at the bottom and closed at the top, and several burners or sources of heat arranged along the outer pipe.

3. The combination of a water receptacle, a vertical outer water pipe connected at top and bottom with, and communicating at both ends, with, the water receptacle, a vertical central pipe within the outer pipe, closed at top and open at the bottom, and a burner or source of heat at the bottom of the outer pipe.

In testimony whereof I have signed my name to this specification in the presence of two subscribing witnesses.

RALPH WALLACE BOWEN.

Witnesses:
　W. H. SINGLETON,
　F. H. WHEELOCK.